(12) United States Patent
Pugh

(10) Patent No.: US 6,311,644 B1
(45) Date of Patent: Nov. 6, 2001

(54) APPARATUS AND METHOD FOR ANIMAL BEHAVIOR TRACKING, PREDICTING AND SIGNALING

(76) Inventor: Carl S. Pugh, 43 Catbreir Rd., Weston, CT (US) 06883

( * ) Notice: Subject to any disclaimer, the term of this patent is extended or adjusted under 35 U.S.C. 154(b) by 0 days.

(21) Appl. No.: 09/497,025

(22) Filed: Feb. 3, 2000

(51) Int. Cl.$^7$ .................................................. A01K 29/00
(52) U.S. Cl. ............................................................ 119/712
(58) Field of Search ................................. 119/712, 702, 119/174, 907

(56) References Cited

U.S. PATENT DOCUMENTS

| | | | |
|---|---|---|---|
| 4,337,726 | * | 7/1982 | Czekajewski et al. .................. 119/1 |
| 5,680,590 | * | 10/1997 | Parti ....................................... 395/500 |
| 5,900,818 | * | 5/1999 | Lemnell ............................... 340/573.3 |
| 5,959,529 | * | 9/1999 | Kail, IV ................................. 340/539 |
| 6,115,679 | * | 9/2000 | Rutter et al. .......................... 702/187 |

* cited by examiner

Primary Examiner—Thomas Price
(74) Attorney, Agent, or Firm—Perman & Green, LLP

(57) ABSTRACT

A behavior tracking apparatus for use in training a dog, the apparatus comprising a memory; a user input, means for associating a time with training event information input by a user into the user input and for recording the associated time in the memory, and an output. The user input is for inputting predetermined training event information into the memory. The predetermined training event information includes an eating event of when the dog eats, a bowel movement event, and a bladder relief event. The output is for displaying the training event information and associated time recorded in the memory.

16 Claims, 3 Drawing Sheets

PupTrain™

TUESDAY, 16 NOVEMBER, 1999 3:10 P

| | | | |
|---|---|---|---|
| | | SLEEP | |
| PEE: | INSIDE | OUTSIDE | MINUTES SINCE LAST PEE |
| POOP: | INSIDE | OUTSIDE | 0.80 |
| DONE: | EATING | SLEEPING | PLAYING |
| CAGE: | PUT IT | LET OUT | COMMENTS |

LAST ACCIDENT: POOP 1:33 HOURS AGO

| TODAY'S EVENTS | | CHANGE TIME: | |
|---|---|---|---|
| 6:10 PM | CAGE OUTSIDE | | COMMENT |
| 4:10 PM | CAGE INSIDE | | |
| 3:10 PM | PLAY | | |
| 11:10 AM | SLEEP | | |
| 10:10 AM | EAT | | |
| 10:10 AM | POOP OUTSIDE | 1:00 | |
| 9:10 AM | POOP INSIDE | 6:55 | |
| 8:10 AM | PEE OUTSIDE | 1:01 | |
| 7:09 AM | PEE INSIDE | 22:49 | |

FIG.3

APPARATUS AND METHOD FOR ANIMAL BEHAVIOR TRACKING, PREDICTING AND SIGNALING

BACKGROUND OF THE INVENTION

1. Field of the Invention

The present invention relates to animal training and, more particularly, to an apparatus and method to assist in animal training.

2. Prior Art

Housebreaking a puppy can be a very trying experience; one marked by periods of great exasperation. Small successes are often marred by frequent accidents. Most of the time when a dog being housebroken has an accident it is actually the failing of the owner, more than the puppy itself. This is usually because one of the fundamentals of animal housebreaking training was broken. These basic tenets include:

Walking the dog after every meal

Walking the dog after a high level of activity

Walking the dog as soon as it wakes up

Walking the dog before bedtime

Walking the dog on a regular schedule in between the above events

In actuality, it is the owner that needs to be trained more so than the pet. Once the owner has learned to adhere to a schedule tailored to the "cycle" of his or her puppy, the housebreaking process proceeds far more smoothly with fewer accidents and less stress. Dogs are actually quite reliable when it comes to timing their bowel movements and urinations.

SUMMARY OF THE INVENTION

In accordance with one embodiment of the present invention, a behavior tracking apparatus for use in training a dog is provided comprising a memory; a user input, means for associating a time and date with the training event information input by a user into the user input and recording the associated time in the memory, and an output. The user input is for inputting predetermined training event information into the memory. The predetermined training event information includes an eating event of when the dog eats, a bowel movement event, and a bladder relief event. The output is for displaying the training event information and associated time recorded in the memory.

In accordance with another embodiment of the present invention, an apparatus for communicating information regarding dog behavioral training among multiple users is provided comprising a memory, a user input, and an output. The user input for recording predetermined training event information into the memory. The output is for outputting the recorded predetermined training event information from the memory. The recorded predetermined training event information which is input by a first user at a first time can be output for review by a second user at a subsequent time.

In accordance with another embodiment of the present invention, an animal behavior tracking, predicting and signaling apparatus is provided comprising a memory, a controller connected to the memory, a user input connected to the controller for inputting predetermined animal behavior events, means for predicting when a predicted animal behavior event will approximately occur based, at least partially, upon the predetermined animal behavior events previously input by a user into the user input, and an output connected to the controller for signaling when the predicted animal behavior event should approximately occur.

In accordance with one method of the present invention, a method of housebreaking a dog is provided comprising steps of inputting occurrence information of a predetermined dog behavior event into an electronic memory; determining when a predicted dog behavior event will occur based, at least partially, upon the input occurrence information; and signaling when the determined predicted dog behavior event is expected to occur.

BRIEF DESCRIPTION OF THE DRAWINGS

The foregoing aspects and other features of the present invention are explained in the following description, taken in connection with the accompanying drawings, wherein:

FIG. 3 is a schematic view of one type of a screen display for the display shown in FIG. 1;

DETAILED DESCRIPTION OF THE PREFERRED EMBODIMENT

Figure 1:
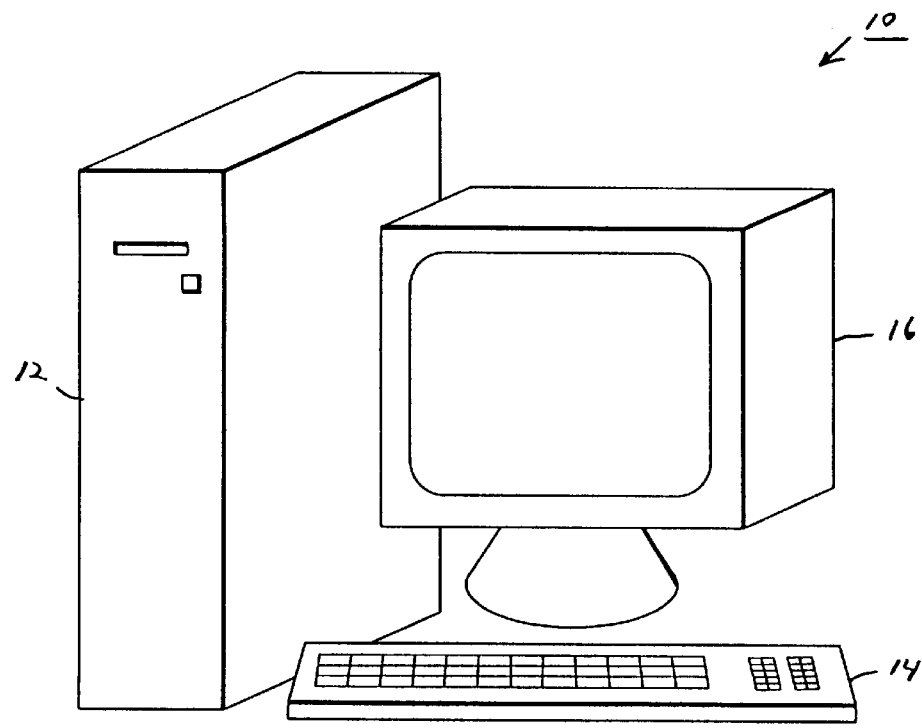
FIG. 1 is a schematic perspective view of an apparatus incorporating features of the present invention.

Referring to FIG. 1, there is shown a schematic perspective view of a an apparatus 10 incorporating features of the present invention. Although the present invention will be described with reference to the embodiments shown in the drawings, it should be understood that the present invention can be embodied in many alternate forms of embodiments. In addition, any suitable size, shape or type of elements or materials could be used.

Figure 2:
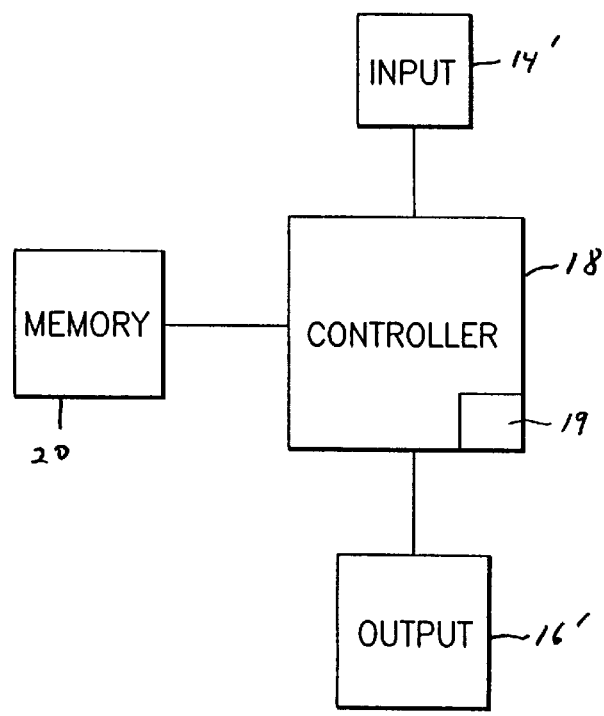
FIG. 2 is a schematic diagram of components of the apparatus shown in FIG. 1.
Figure 5:
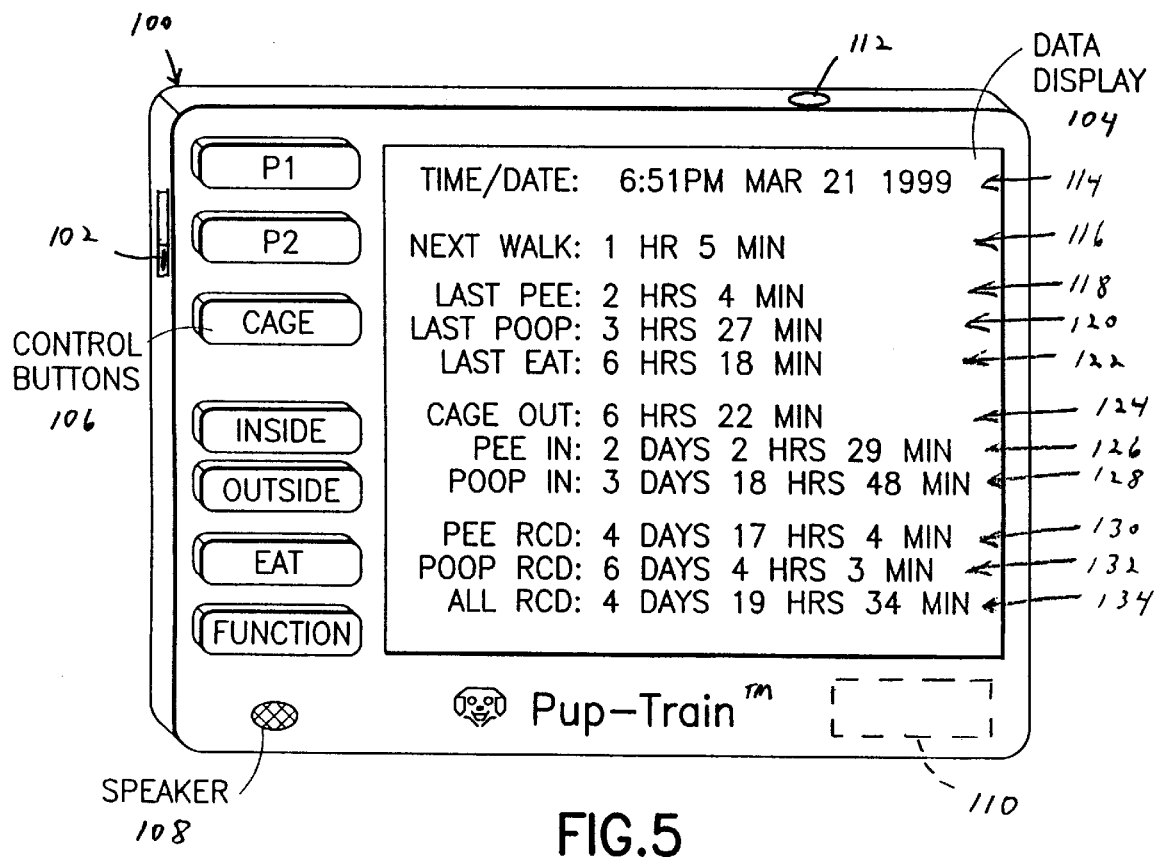
FIG. 5 is a schematic perspective view of another embodiment of the present invention.

In this embodiment the apparatus 10 is a personal computer (PC) and generally comprises a computer 12, a keyboard 14 and a display 16. In alternate embodiments features of the present invention could be used with any suitable computer, such as a notebook computer, PALM PILOTS, a PDA (personal digital assistant) or a dedicated apparatus (such as shown in FIG. 5). Referring also to FIG. 2 the primary components of any such apparatus would include a controller 18, such as a microprocessor, a memory 20, an input device 14' and an output device 16'. The input device 14' could include one or more of any suitable type of input device such as the keyboard 14, an alphanumeric keypad, a microphone such as when voice recognition software is used, a touch screen, or dedicated entry keys. The output device 16' could include one or more of any suitable type of output device such as the CRT (cathode ray tube) display 16, an LCD display, a printer or a speaker. The memory 20 preferably comprises a RAM and a ROM.

For the embodiment shown in FIG. 1, the computer 12 includes software to allow a user to enter predetermined types of information, store the entered information into its memory, and subsequently display the stored information when desired. Any suitable database software could be used. In this embodiment the software has been configured to record information specifically for use in housebreaking a dog. However, as further explained below, features of the present invention could be used for other training activities and/or with other types of animals.

Referring also to FIG. 3, the software in this embodiment has been configured to generate an image 22 on the display 16 which comprises a day, date, and time display section 24, user selectable icons 26, a last accident display section 28, a time change section 30, an event display section 32, and a time since last PEE display section 34. The display could also or alternatively have a time since last POOP section. In alternate embodiments more or less image items could be provided and/or could be provided on separate image screens and/or could be organized in any suitable relationship on the screen(s) relative to each other. The day, date and time display section 24 preferably displays the current day, date and time which can be obtained from a clock/calendar software program also running on the computer. In this embodiment, the user selectable icons 26 are organized into six categories: SLEEP, PEE, POOP, DONE, CAGE and COMMENTS. In alternate embodiments more or less than six categories could be provided.

The first category comprises a single icon; SLEEP 36. The user can select the icon when the dog goes to sleep.

The computer will record the occurrence of this event and attach a time/date stamp to the event. Indicia corresponding to the event, such as "SLEEP" can be displayed in the event display section 32 if desired as well as a comment. Alternatively, the SLEEP icon need not be provided, such as when sleep events are not recorded or tracked or used to assist in making predictions. The second category (PEE) comprises two icons; INSIDE 38 and OUTSIDE 40. The PEE INSIDE icon 38 corresponds to RECORDING an event of the dog urinating inside the owner's home. The PEE OUTSIDE icon 40 corresponds to RECORDING an event of the dog urinating outside the owner's home. The user can select either one of the PEE icons when the dog urinates to record the urination event, whether the event occurs inside or outside the home, and the computer can automatically attach a time/date stamp to the urination event. The third category (POOP) comprises two icons; INSIDE 42 and OUTSIDE 44. The POOP INSIDE icon 42 corresponds to RECORDING an event of the dog having a bowel movement inside the owner's home. The POOP OUTSIDE icon 44 corresponds to RECORDING an event of the dog having a bowel movement outside the owner's home. The user can select either one of the POOP icons when the dog has a bowel movement to record the bowel movement event, whether the event occurs inside or outside the home, and the computer can automatically attach a time/date stamp to the bowel movement event. The forth category (DONE) comprises three icons; EATING 46, SLEEPING 48, and PLAYING 50. The DONE EATING icon 46 corresponds to recording when the dog has eaten. An equivalent DONE DRINKING icon is not necessary because the dog should always have plenty of water to drink whenever the dog is thirsty. The DONE SLEEPING icon 48 corresponds to recording when the dog wakes up from sleeping. The DONE PLAYING icon 50 corresponds to recording when the dog has had a play time event, such as playing with the owner. Alternatively, the PLAYING icon 50 need not be provided, such as when playing events are not recorded or tracked or used to assist in making predictions. The fifth category (CAGE) comprises two icons; PUT IN 52 and LET OUT 54. These two icons correspond to cage training events when the owner uses a cage or kennel for the dog. These icons need not be provided. The CAGE PUT IN icon 52 corresponds to recording when the dog is put into its cage. THE CAGE LET OUT icon 54 corresponds to recording when the dog is let out of its cage. The sixth category (COMMENTS) comprises one icon; COMMENTS 56. The icon can be selected by a user to display a separate display page on the display 16 for entering comments which the user would like to record. However, in an alternate embodiment the COMMENTS icon and a separate comments display page need not be provided. In alternate embodiments any suitable types of user selectable icons could be provided. However, the most basic events to be recorded would be a bowel movement event and a bladder relief or urination event. By recording these events a pattern should develop and the user can intuitively predict at what times during a 24 hour period bowel movement events and/or bladder relief events should occur. The user can then use this pattern and intuitive prediction based upon the pattern to hopefully position the dog outside the home when a bowel movement event or bladder relief event is expected to occur. Thus, the apparatus accomplishes two tasks; it assists in educating the user as to when bowel movement events and/or bladder relief events are most likely to occur based upon previously recorded such events and, it helps to train the dog that such events should occur outside the home.

The embodiment shown in FIG. 3 is more sophisticated than merely recording a bladder relief event, a bowel movement event, and their corresponding event times and dates. The embodiment also can record three other events which have been found to precipitate bladder relief events and bowel movement events; namely, waking from a sleep event, a playing event, and/or an eating event (collectively referred to as precipitating events). By recording when these precipitating events occur a more detailed pattern of when the bowel movement events and bladder relief events occur relative to the precipitating events can be predicted by the user. In alternate embodiments more or less precipitating events could be recorded. One or both of the CAGE events could also be found to be precipitating events.

In this embodiment the PEE (bladder relief event) and POOP (bowel movement event) recordations have been subcategorized into INSIDE and OUTSIDE events. This need not be done. However, this type of subcategorization can be useful in promoting the user to use the present invention. In particular, the recordation of INSIDE events versus OUTSIDE events can help the user track the increasing success of the housebreaking of the dog and identify lapses in the user(s)' repetitive housebreaking training behavior which result in the dog having a bowel movement event and/or bladder relief event inside the house. Increasing success and/or quick identification of the user(s)' training behavior will promote a consistent housing breaking training which should speed up the housing breaking process. Increased consistency of training, through recordation of predetermined events and pattern recognition with the present invention, can be achieved especially in households having multiple people and in households having children, wherein the present invention can be used as a tool to help educate the children of proper patterns to follow to prevent "accidents" from occurring inside the house and educate the children of proper housebreaking training techniques.

For the embodiment shown in FIG. 3, the display image 22 includes two immediate predictive guides; namely, the time since last PEE display section 34 and the event display section 32. The time since last PEE display section 34 displays a time 34a, such as in minutes, since one of the PEE icons 38, 40 were selected. As seen in FIG. 2, the controller 18 can have a timer 19 which the controller 18 can use to determine when the last bladder relief event occurred. This information 34a can help a user immediately recognize that perhaps a long amount of time has elapsed since the dog had a bladder relief event and perhaps the dog should be immediately taken outside to prevent an accident. Again, this type of information can be particularly helpful in multi-person households to immediately convey recorded information, input by any one or more of the members of the household, without the user having to directly communicate with other members of the household; who might be absent. In addition, the event display section 32 can be useful in evaluating an absence of an activity for that day which the dog might need, or which has already occurred for that day and does not need to be repeated, such as an eating event, or a cage put in or cage let out event. Thus, the present invention also functions as a communication tool for members of a multi-person household. Additional icons for communication purposes could also be provided, such as WALK to indicate when the dog is walked, OBEDIENCE to indicate when obedience training occurred, or OTHER wherein the user could type in an appropriate communication message or select from a menu of messages that could appear in the event display section 32. In this embodiment the event display section 32 generally comprises a recorded event display area 58, an associated time display area 60, a time since last area 62, and a comment area 64. However, the section 32 could have more or less areas and/or could be organized in any suitable fashion. The longest time between accidents display section 28 can also be used by the household to motivate the user(s) to see how long they can go between accidents; similar to a game or a contest. This positive reinforcement promotes faster and more consistent housebreaking training.

In addition to the image display 22, the input data recorded in the memory can be output in any suitable number of ways. For example, the data could be displayed on the display 16 in predetermined and/or configurable tables and/or charts and/or with event occurrence relationships. The data could be printed on an attached printer (not shown). The data could be output through a communications link (not shown) to another device, such as another computer in the household (such as from a portable electronic device to a personal computer) or a computer in a veterinary doctor's office (such as via the Internet). Any suitable output for the recorded data could be provided.

Figure 4:
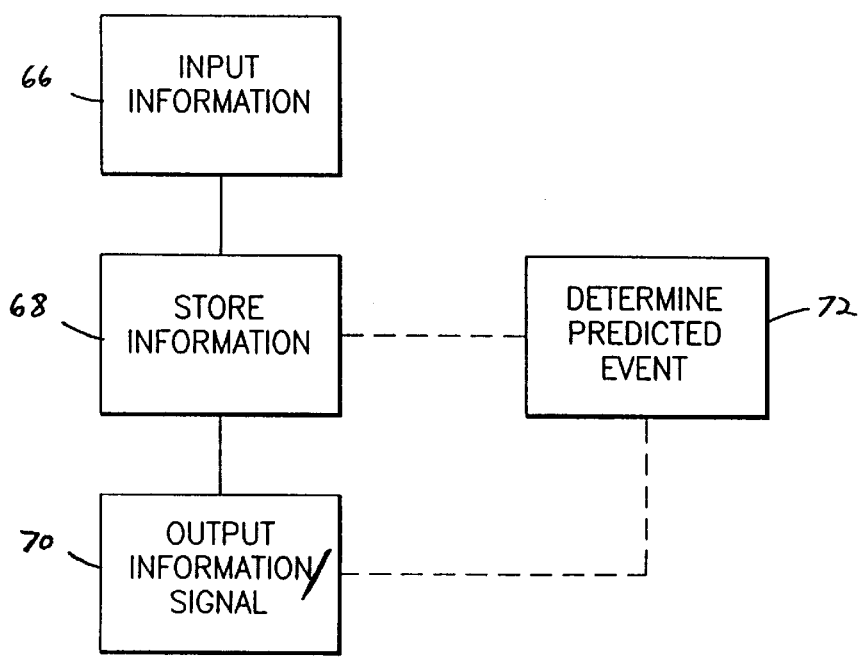
FIG. 4 is a schematic diagram illustrating steps used with one method of the present invention.

Referring now to FIG. 4, one method of the present invention merely comprises inputting 66 information, storing 68 the input information, and outputting 70 the stored information. The user would use the output information to mentally predict how to avoid an accident. However, FIG. 4 also illustrates another method of the present invention wherein the apparatus could also be programmed to determine 72 when a predicted event should occur. The predicted event is preferably a future bowel movement event and/or a future bladder relief event. However, the apparatus could be programmed, based upon information input by the user, to determine when any suitable predicted event might occur, such as sleep, digging or mischief. For example, if a pattern develops of the dog having a bowel movement event one hour after eating, the apparatus could be programmed to recognize this pattern and output information or a signal to the user of when the predicted event will occur. Thus, the apparatus can warn the user in advance of when the event is likely to occur. The user can take appropriate action to insure the dog is outside when the predicted event is expected to occur. As another example, if a pattern develops of the dog having a bladder relief event ten minutes after a play event ends or ten minutes after waking from a sleep event, the apparatus can signal or inform the user and the user can take appropriate precautions to insure that the dog is outside the home when the event is expected to occur. The signal could be an audio signal, such as an alarm five minutes before the predicted event is expected to occur. The apparatus could be preprogrammed with expected or typical event relationship information to help the user when the dog is first brought into the home (i.e.: before a sufficient quantity of data has been input into the apparatus by the user). This preprogrammed information could be selected or loaded, such as by means of the internet or by a modem, wherein the information could be specific to the dog's breed and/or age. This could also provide the user with a reference, if the dog's behavior is atypical, to seek advice from a veterinarian doctor or animal specialist. The apparatus, through input of information over time, can become more accurate in predicting events and modify its advice over time as more information is added. The controller can use an algorithm to recommend and/or signal a walk time based upon recorded information.

Referring now to FIG. 5, a perspective view of another embodiment of the present invention is shown. In this embodiment the apparatus 100 is generally a hand-held portable apparatus. The apparatus 100 generally comprises an ON/OFF selector 102, a display 104, user selectable buttons 106, a speaker 108, a battery 110, and a memory and microprocessor (not shown). The apparatus 100 can also include a communications port 112, such as an IR transmitter, serial port or USB port. The display 104 could be an LCD or flat panel display. In the display shown, the displayed information includes the current date and time 114, the time until the recommended next walk 116, the time since the last PEE event occurred 118, the time since the last POOP event occurred 120, the time since the animal has last eaten 122, the time since the animal was last put in or out of the cage 124, the time since the last PEE accident event occurred 126, the time since the last POOP accident event occurred 128, the longest recorded time between PEE accident events 130 (the PEE accident avoidance record), the longest recorded time between POOP accident events 132 (the POOP accident avoidance record), and the all time record between any accidents 134. Of course, the information shown on the display in FIG. 5 is merely suggestive and could include more or less information in any suitable display format. The buttons 106 can include dedicated event buttons, such as to indicate an eat event, a cage event, an inside event or an outside event. For example, the P1 button could be labeled "PEE" and be a dedicated button for recording a bladder relief event. As another example, the P2 button could be labeled "POOP" and be a dedicated button for recording a bowel movement event. Other types of dedicated buttons could be provided. The buttons 106 can also include programmable buttons and a function button. As another alternative the apparatus, similar to radio telephone handsets, could include a multi-function scroll button, a roller button or a trackball button and programming of the apparatus, or recording of information, or output of information could include menu driven selections and/or functions.

In one embodiment of the present invention the programming could be adaptive in that as the puppy gets older the program provides more flexibility as to when the dog should be let outside. When the puppy is very young accidents are far more common and the owners are least educated/conditioned to let the dog out. The dog's age could be enterable into the program and used in predicting events and/or adjusting predictions. The dog's breed and/or weight could also be enterable into the program and used for predictions. Information regarding walking the dog could be inputable as well as viewable on the display; thus avoiding the dog being walked too much or not enough. Quantities and/or qualities of events could also be input and used for tracking and/or predicting. Water consumption could also be tracked. Unusual events (such as if the dog is sick one day) could be deletable and incorrect entries could be modifiable.

The apparatus could also be configured for use with multiple dogs (by allowing entry of a dog's name or identifier with the information to be recorded) and/or recording the identity of the user inputting information (for use in multi-person households). The user could also program the apparatus to sound an alarm at a predetermined time as a reminder to do a certain activity, such as let the dog out at a specific time, or feed the dog or cage the dog at specific times. This might be very useful in households with children to have the children perform the desired activity. The present invention can be used as an information resource regarding the present status of the dog's previous events for the day (useful in a multi-person household) and for data analysis with a constantly moving housebreaking goal or target. The present invention results in the owner(s) being more attentive and diligent in training the dog and can give feedback to the user(s) regarding their success, failures, and possible future events. The portable model can be used during travel or vacation or taken with the user during a walk with the dog. The apparatus can be about the size of a small desktop calculator. It can contain a microprocessor that records and analyzes the major body functions of your puppy. Each time your dog eats, sleeps, pees or poops you simply press one or two buttons to record the event. The apparatus can automatically add the date and time to each occurrence.

Over time a clear pattern of behavior develops. For example, it may be that your dog always goes to the bathroom between twenty and thirty minutes after being fed. The apparatus can alert you when its time to walk your dog. Your new puppy will grow and mature rapidly. The longer you use the apparatus the more data it collects and the more accurately it can predict your dog's habits. As your dog changes, so will the feedback provided by the apparatus.

The habits of a 12 week-old puppy are quite different than those of an 18 week-old puppy. Because the apparatus is constantly collecting and analyzing the data about your dog's cycle, it is also modifying the feedback or "cues" it provides to the owner about when the dog needs to be walk. The apparatus learns more rapidly from every event than it would ever be possible for the owner to do so.

While an owner may develop a vague idea of this pattern, the clock-synched computer brain and memory capacity are infinitely more precise. Each time your dog pees, poops, eats or sleeps, you simply press the appropriate button. If you are cage-training your dog, you also press a button each time your pup is placed in or out of the cage. The apparatus quickly learns the habits of your dog and alerts you before an accident might occur.

Many time the reason your puppy has an accident is because you simply did not recognize his or her ever-evolving schedule. Another common reason is you were simply distracted and missed a scheduled walk-time. The apparatus keeps either of these occurrences from happening by alerting you each time your dog needs to be walked or let outside.

The apparatus can be placed on a kitchen counter or other convenient place in a home. Set the volume control so that you can hear the alert tone from elsewhere in the house (as you would a kitchen timer). Whenever it's time to walk the dog the apparatus will sound a reminder tone.

If you do not respond within a specific time (such as sixty seconds) to the first tone, it can repeat again every sixty seconds. If you are on the phone or busy, a "sleep" button can silence the apparatus for a predetermined time, such as 5 minutes. When you take the dog outside, hit the "OUT" button. Upon return you tap the "IN" button, plus the appropriate one for any activity (pee and/or poop). After each meal, touch the "EAT" button. In this manner, the apparatus records and learns your dog's habits and cycle.

The apparatus can also tell you at the touch of a button:

How long until you dog needs to go out again.

How many days and hours since the last accident.

Your pet's longest accident-free period in days and hours. This can invite a game mentality to help children participate in training. (Try for a new record!)

How long it's been since your dog was walked. This is a great feature for households where several people are sharing the responsibility for walking the dog. Everyone always knows dog's status without having to constantly compare notes.

The different embodiments can include multi-time signals, voice prompts for more specific feedback, and/or a PC docking station. Features of the present invention could be used for animals other than dogs and/or could be used for other behavioral predicting and/or training including obedience training or property containment training (such as with use of a radio frequency collar and underground wire).

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A canine behavior tracking computer apparatus for use in training a dog, the apparatus comprising:
   a memory programmed to store information relating to a predetermined training event in a predetermined relational format;
   a user input operatively associated with said memory for inputting said predetermined training event information into the memory, the predetermined training event information including at least, a bowel movement event, and a bladder relief event;
   a processor operatively associated with said memory and said user input and programmed to establish trends relating to the occurrence of said predetermined training events based on said stored information;
   a digital clock operatively associated with said processor to allow said processor to chronologically organize said information stored in said memory; and
   an output for communicating the stored training event information and trends to said user.

2. A behavior tracking apparatus, as in claim 1, further comprising a housing sized and shaped to be hand-held and portable.

3. A behavior tracking apparatus, as in claim 1, wherein the user input comprises dedicated buttons for inputting specific predetermined ones of the events.

4. A behavior tracking apparatus, as in claim 3, wherein one of the dedicated buttons inputs occurrence of an eating event.

5. A behavior tracking apparatus, as in claim 3, wherein one of the dedicated buttons inputs occurrence of the bowel movement event and one of the dedicated buttons inputs occurrence of said bladder relief event.

6. A behavior tracking apparatus, as in claim 1, wherein said processor further comprises a program for predicting when a predetermined training event should occur based, at least partially, upon said stored information.

7. A behavior tracking apparatus, as in claim 6, further comprising a signaler for signaling when the predicted animal training event is about to occur.

8. A behavior tracking apparatus, as in claim 1, further comprising a controller connected to the memory and the output, wherein the controller is programmable by a user to vary display of the training event information and its associated time on the output.

9. A behavior tracking apparatus, as in claim 1, wherein the digital clock also comprises means for associating a date with the training event information input by the user.

10. A behavior tracking apparatus, as in claim 1, wherein the user input comprises means for inputting additional information other than predetermined training event information into the memory.

11. A behavior tracking apparatus, as in claim 1, wherein said processor automatically enters a time and date entry for said predetermined training event.

12. A behavior tracking apparatus, as in claim 1, further comprising:
a second processor remote from said first processor constructed to communicate with said first processor to obtain access to said stored information by another user.

13. A behavior tracking apparatus, as in claim 1, further comprising buttons, operable by the user, said buttons dedicated to accessing predetermined specific items of data.

14. A behavior tracking apparatus, as in claim 1, further comprising an alarm triggered by said processor after the expiration of a predetermined time period after the occurrence of a particular training event.

15. A method of housebreaking a dog, wherein a user utilizes a computer having a memory, a processor, a user input, a digital clock and an output device, comprising steps of:
inputting occurrence information of a predetermined dog behavior event into said memory;
storing said information relating to a predetermined training event in a predetermined relational format in said memory;
organizing said information relative to time as part of said format;
processing said information to determine when a predicted dog behavior event may occur based, at least partially, upon the input occurrence information; and
signaling the user when the determined predicted dog behavior event is expected to occur.

16. A method of housebreaking a dog, wherein a user utilizes a computer having a memory, a processor, a user input, a digital clock and an output device, further comprising steps of:
storing data with respect to normal behavioral events relating to canines in general; and
comparing data with respect to a specific dog with the data stored relating to canines in general and determining whether or not a specific behavior is normal.

* * * * *